United States Patent
Liu et al.

(10) Patent No.: US 9,692,056 B1
(45) Date of Patent: Jun. 27, 2017

(54) DUAL CURRENT COLLECTORS FOR BATTERY ELECTRODES

(71) Applicant: Amprius, Inc., Sunnyvale, CA (US)

(72) Inventors: Zuqin Liu, Sunnyvale, CA (US); Song Han, Foster City, CA (US)

(73) Assignee: Amprius, Inc., Sunnyvale, CA (US)

( * ) Notice: Subject to any disclaimer, the term of this patent is extended or adjusted under 35 U.S.C. 154(b) by 0 days.

(21) Appl. No.: 13/863,358

(22) Filed: Apr. 15, 2013

Related U.S. Application Data

(60) Provisional application No. 61/623,860, filed on Apr. 13, 2012.

(51) Int. Cl.
| | | |
|---|---|---|
| *H01M 4/58* | (2010.01) | |
| *H01M 4/64* | (2006.01) | |
| *H01M 4/04* | (2006.01) | |
| H01M 4/66 | (2006.01) | |
| H01M 4/36 | (2006.01) | |

(Continued)

(52) U.S. Cl.
CPC .......... *H01M 4/64* (2013.01); *H01M 4/0402* (2013.01); *H01M 4/045* (2013.01); *H01M 4/0416* (2013.01); *H01M 4/0428* (2013.01); *H01M 4/58* (2013.01); *H01M 4/13* (2013.01); *H01M 4/136* (2013.01); *H01M 4/1395* (2013.01); *H01M 4/366* (2013.01); *H01M 4/38* (2013.01); *H01M 4/42* (2013.01); *H01M 4/66* (2013.01); *H01M 4/661* (2013.01); *H01M 4/667* (2013.01); *H01M 4/72* (2013.01); *H01M 4/75* (2013.01)

(58) Field of Classification Search
CPC ....................................................... H01M 4/58
See application file for complete search history.

(56) References Cited

U.S. PATENT DOCUMENTS

| | | | | |
|---|---|---|---|---|
| 7,531,274 B1 * | 5/2009 | Roy et al. | ...................... | 429/233 |
| 2010/0055571 A1 * | 3/2010 | Le Guenne et al. | ...... | 429/231.95 |

(Continued)

FOREIGN PATENT DOCUMENTS

JP       2004-103474       *    4/2004

OTHER PUBLICATIONS

JP 2004-103474 MT.*

*Primary Examiner* — Patrick Ryan
*Assistant Examiner* — Alex Usyatinsky
(74) *Attorney, Agent, or Firm* — Weaver Austin Villeneuve & Sampson LLP

(57) ABSTRACT

Batteries having improved current collection are provided. In some implementations, an electrode structure of a battery may include an active material and two or more current collectors in electrical communication with the active material. In some implementations, an electrode structure of a battery may include two or more current collector layers. According to various implementations, the electrode structure may or may not include a current collector substrate. In some implementations, a battery anode includes a current collector substrate in electronic contact with nanostructured active material. In order to ensure that electronic communication between the active material and the current collector substrate is maintained throughout the life of the battery, a second electronically conductive path is provided in the form of a current collector layer over the nanostructured active material. The additional layer is thin and electronically conductive, and does not interfere adversely with battery operation.

18 Claims, 16 Drawing Sheets

(51) Int. Cl.
  *H01M 4/75*    (2006.01)
  *H01M 4/42*    (2006.01)
  *H01M 4/72*    (2006.01)
  *H01M 4/136*   (2010.01)
  *H01M 4/13*    (2010.01)
  *H01M 4/38*    (2006.01)
  *H01M 4/1395*  (2010.01)

(56) References Cited

U.S. PATENT DOCUMENTS

2011/0091776 A1*  4/2011  Rubino et al. ............... 429/338
2011/0159365 A1*  6/2011  Loveness ............ H01M 4/0428
                                                   429/218.1
2013/0171502 A1*  7/2013  Chen et al. ................. 429/149

* cited by examiner

DUAL CURRENT COLLECTORS FOR BATTERY ELECTRODES

CROSS-REFERENCE TO RELATED APPLICATION

This application claims the benefit of U.S. Provisional Application No. 61/623,860, filed Apr. 13, 2012, entitled "Dual Current Collectors for Battery Electrodes," which is incorporated herein by reference in its entirety for all purposes.

STATEMENT OF GOVERNMENT SUPPORT

The invention described and claimed herein was made with United States Government support under NIST ATP Award No. 70NANB10H006, awarded by the National Institute of Standards and Technology. The United States Government has certain rights in this invention.

FIELD OF INVENTION

This invention relates generally to electrodes in batteries, and, more specifically, to current collectors for such electrodes.

SUMMARY

One aspect described herein relates to an electrode structure including a layer of electrode active material, the layer having a first side and a second side, the second side opposite the first side; a first current collector adjacent to the first side and in electronic communication with the electrode active material; and a second current collector adjacent to the second side and in electronic communication with both the electrode active material and the first current collector.

Examples of first current collector materials include nickel, copper, aluminum, titanium, and stainless steel. In some implementations, the first current collector can act as a primary current collector for the electrode. In some implementations, the first current collector can be a multi-layered structure.

Examples of active materials include silicon, germanium, tin, and alloys thereof. In some implementations, the electrode active material includes a plurality of nanostructures. For example, the electrode active material can be an anode active material having a plurality of nanostructures. According to various implementations, the nanostructures can be linear or multidimensional, or a combination thereof. In some implementations, the plurality of nanostructures can include template nanowires coated with shells of the anode active material. In some implementations, the layer of electrode active material has within it one or more sublayers.

According to various implementations, the primary conductive materials of the first current collector and the second current collector can be the same or different materials. Examples of second current collector materials include copper, nickel, chromium, tungsten, metal nitrides, metal oxides, metal carbides, carbon, conductive polymers, and combinations thereof. In some implementations, the second current collector can include one or more graphene sheets, carbon nanofibers or carbon nanotubes. In some implementations, the second current collector includes metal fibers such as metal nanofibers. In some implementations, the second current collector includes a nanostructured network. According to various implementations, the nanostructures can be linear or multidimensional, or a combination thereof.

For example, the second current collector can include a two-dimensional network with branches extending from the two-dimensional network into the layer of active material. Thickness of the second current collector can range between about 1 nanometer and 5 micrometers thick, for example, between about 100 nanometers and 1 micrometer thick. In some implementations, the second current collector includes one or more sublayers interspersed with one or more sublayers of active material. According to various implementations, the ratio of total thickness of active material to total thickness of second current collector layers can be between about 150:1 to 5:1, or in some implementations, 1:1.

Another aspect described herein relates to an electrode structure including a layer of electrode active material, the layer having a first side and a second side, the second side opposite the first side; and a first current collector layer adjacent to the first side and in electronic communication with the electrode active material; and a second current collector layer adjacent to the second side and in electronic communication with both the electrode active material and the first current collector layer.

Another aspect relates to a battery including anode including a layer of anode active material, the layer having a first side and a second side, the second side opposite the first side; a first current collector adjacent to the first side and in electronic communication with the electrode active material; and a second current collector adjacent to the second side and in electronic communication with both the electrode active material and the first current collector; a cathode comprising lithium; and an electrolyte between the anode and the cathode, the electrolyte configured to allow conduction of lithium ions.

Another aspect relates to a method of forming an electrode structure including forming a layer of active material on the first current collector; and forming the second current collector on the layer of active material.

BRIEF DESCRIPTION OF THE DRAWINGS

These and other aspects of the invention are described further below with reference to the figures.

DETAILED DESCRIPTION OF EXAMPLE EMBODIMENTS

Figure 1:
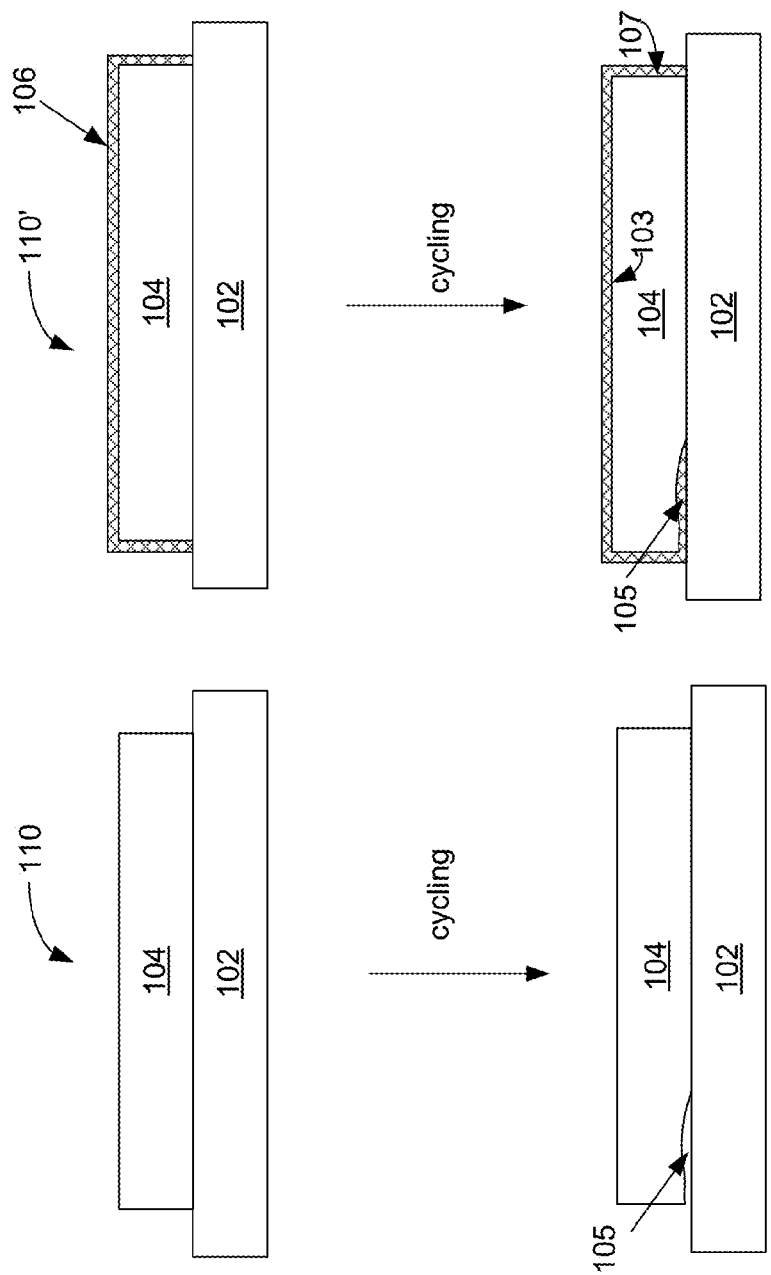
FIG. 1 shows cross-sectional depictions of electrode structures including an active material layer on a current collector substrate, including an example of an electrode having current collector layer covering an active material layer.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments. Example embodiments are illustrated in the context of current collectors for battery electrodes. The skilled artisan will readily appreciate, however, that the materials and methods disclosed herein will have application in a number of other contexts where continuous electronic communication is desirable, particularly where fracture of components can occur.

To allow electrons to enter and leave a battery electrode, it is useful to have electrode active material in electronic communication with a current collector, which, in turn, is in electronic communication with an outside load. During battery cycling, stresses can occur in the electrode, and contact between active material and its current collector can be broken, causing reduced performance or failure of the battery.

The description herein provides improved current collection in batteries. In some implementations, an electrode structure of a battery may include an active material and two or more current collectors in electrical communication with the active material. In some implementations, an electrode structure of a battery may include two or more current collector layers. According to various implementations, the electrode structure may or may not include a current collector substrate.

Implementations of the electrode structures described herein can have one or more of the following potential advantages. In some implementations, multiple electronically conductive pathways between the active material of electrode and an external load can extend battery life by ensuring that electronic communication with the active material is maintained throughout the life of the battery. For example, if delamination were to occur between an active material layer and a current collector substrate, implementations of the electrode structures described herein would still provide sufficient current collector area for flow of electrons so that battery performance is not compromised. In some implementations, the distance electrons travel through an active material until reaching a more conductive material is reduced, improving battery performance.

While example implementations are described below chiefly in the context of electrodes of lithium ion batteries, the scope of the description is not so limited and includes current collectors and electrode structures for other battery types. In some implementations, the electrode structures may be implemented in rechargeable cells in which repeated cycling can cause delamination and other issues. The electrode structures may also be implemented in primary cells. Non-limiting examples of cell types with which the electrode structures can be implemented include alkali metal cells, nickel metal hydride cells, nickel cadmium cells, nickel-hydrogen cells, and zinc-air batteries. According to various implementations, the electrode structures may be positive or negative electrode structures. In some implementations, the electrode structures described herein are implemented with electrodes configured for intercalation and deintercalation of a species into an active material.

Introduction

The electrode structures described herein may include a layer of an electrode active material. An active material is a chemically active material that participates in the electrochemical charge/discharge reaction. In some implementations, a high capacity active material may be used. For lithium ion cells, a high capacity active material may be defined as an active material with a theoretical lithiation capacity of at least about 700 mAh/g. The theoretical capacity of the active material is distinguished from an actual operating capacity of the electrode and/or cell. Generally, an operating capacity is a fraction of the theoretical capacity. For reference, the theoretical capacity of silicon is 4200 mAh/g. Examples of high capacity materials for lithium ion electrodes can include various silicon-containing materials, such as crystalline silicon, amorphous silicon, silicides, silicon oxides, sub-oxides, and oxy-nitrides. Other examples include tin-containing materials (such as tin and tin oxide), germanium-containing materials, carbon-containing materials, a variety of metal hydrides (such as magnesium hydride), silicides, phosphides, and nitrides. Still other examples include carbon-silicon combinations, such as carbon-coated silicon, silicon-coated carbon, carbon doped with silicon, silicon doped with carbon, and alloys including carbon and silicon. Similar combinations of carbon and germanium, as well as similar combinations of carbon and tin, may be used. Various aluminum-containing materials may be used as well.

Other examples of active materials for lithium ion cells can include lithium cobalt oxide and lithium iron phosphate (e.g., for a cathode) and graphite or other forms of carbon (e.g., for an anode). Structures formed from active materials, including high capacity active materials, may have various shapes and dimensions depending on compositions, crystallographic structures (e.g., crystalline, amorphous), deposition process parameters, and many other factors. Shapes and sizes may also change during cycling.

Active materials, including high capacity active materials, can be generally formed into structures such that their cross-section dimensions are generally below their fracture limits. In certain embodiments, a cross-section dimension is between about 1 nanometer and 10,000 nanometers. In more specific embodiments, a cross-section dimension is between about 5 nanometers and 1000 nanometers, and more specifically between 10 nanometers and 200 nanometers. These dimension ranges are generally applicable to silicon containing high capacity active materials, such as amorphous or crystalline silicon.

Active materials, including high capacity active materials may be formed into various types of nanostructures, which have cross-section dimensions less than 1,000 nanometers, i.e., at least one nanoscale dimension. Some examples of nanostructures include nanofilms that have a nanoscale dimension along one axis, nanowires that have nanoscale dimensions along two axes, and nanoparticles that have nanoscale dimensions along all three axes. For the purposes of this document, nanowires are defined as structures that have, on average, an aspect ratio of at least about four to distinguish them from nanoparticles. In certain examples, the average aspect ratio may be at least about ten, at least about one hundred, or even at least about one thousand. Active materials formed into nanowires can undergo substantial swelling without disrupting the overall electrode structure. Nanowires can also provide electrical and mechanical connections within an electrode layer, especially along their lengths, which may extend substantially perpendicular to a conductive substrate and determine, at least in part, the thickness of the electrode active material layer. In some implementations a nanostructured active material layer can include multidimensional nanostructures as shown in the SEM image in FIG. 9E. Nanostructures containing high capacity active materials may be hollow. The cross-section profile of such hollow nanostructures includes void regions surrounded by annular solid regions. Alternatively, the hollow nanostructures may be tapered. Hollow nanostructures may have nanoscale wall thickness (e.g., less than 1,000 nanometers). In some embodiments, the average cross-section dimension (e.g., the average diameter) of hollow nanotubes may be less than 1,000 nanometers. In other embodiments, hollow nanotubes may have a micrometer-scale cross-section dimension, while their wall thickness is at the nanoscale. Examples of hollow nanostructures containing active material are described in U.S. Patent Publication No. 2010/0330423, incorporated by reference herein in its entirety.

According to various implementations, active material nanostructures may be grown from catalysts on the current collector otherwise (thereby producing "growth rooted" active materials). Active materials may also be bound to a current collector substrate using a polymer binder, attached directly to a current collector substrate either during their fabrication by deposition or growth, or attached after their fabrication (by, e.g., sintering or otherwise fusing).

An active material layer, also referred to as an active material layer, is an electrode layer that contains an active material and, generally, does not include a substrate. However, in some cases, the boundary between an active material layer and a substrate is not sharp or abrupt. This may be the case, for example, where the substrate is or includes a mesh or foam. In certain embodiments, a conductive substrate may abut one or two active layers of an electrode. For example, an active material may be deposited as nanowires onto a metallic foil forming an active layer in the contact with the metallic foil. In other embodiments, an active layer may intertwine with a substrate, such as mesh substrate or a substrate that is reconfigured after nanowire deposition. In another example, nanowires or other nanostructures may be grown from catalyst coatings or catalyst islands on the solid or mesh substrate. Examples of nanostructure growth and morphology are described in U.S. Pat. No. 8,257,866, which is incorporated by reference herein in its entirety. An active layer may also contain other components that are not active materials, such as conductive additives and binders, which may be collectively referred to as additives.

In some implementations, an electrochemically active electrode material for use in a lithium ion cell includes a nanostructured template and a layer of an electrochemically active material that coats the nanostructured template. The electrochemically active material is configured to take in and release lithium ions during cycling of the lithium ion cell. Further, the nanostructured template may facilitate the conduction of electrical current to and from the electrochemically active material. An electrochemically active electrode material may also include a shell formed over the layer of the electrochemically active material. The shell may include carbon, copper, a polymer, a sulfide, and/or a metal oxide. In some implementations the nanostructured template may include a metal silicide. Examples of a metal silicide in the nanostructured template include nickel silicide, cobalt silicide, copper silicide, silver silicide, chromium silicide, titanium silicide, aluminum silicide, zinc silicide, and iron silicide. Examples of active layers including nanostructured templates and methods of fabrication are described in U.S. Pat. No. 8,257,866, incorporated by reference herein in its entirety.

A substrate may be a metallic foil, an open structure substrate (e.g., a mesh or foam), a composite that include structural and conductive materials, and other forms. For example, substrate materials for electrodes used in various lithium ion cells may include copper and/or copper dendrite coated metal oxides, stainless steel, titanium, aluminum, nickel (also used as a diffusion barrier), chromium, tungsten, metal nitrides, metal carbides, metal oxides, carbon, carbon fiber, graphite, graphene, carbon mesh, conductive polymers, or combinations of above including multi-layer structures. Selection of the materials may also depend on electrochemical potentials of the materials. The substrate material may be formed as a foil, films, mesh, laminate, wires, tubes, particles, multi-layer structure, or any other suitable configurations. For example, a current collector substrate may be a stainless steel foil having a thickness of between about 1 micrometer and 50 micrometers. In another example, a current collector substrate may be a copper foil with thickness of between about 5 micrometers and 50 micrometers. Certain substrate examples are described in U.S. patent application Ser. No. 12/437,529 filed on May 7, 2009 (published as U.S. Patent Publication 2010/0285358) and U.S. patent application Ser. No. 12/944,596, filed Oct. 11, 2010 (published as 2011/0111296), which are incorporated by reference herein in their entireties.

In some implementations, a current collector substrate may be a multi-layer substrate. Examples of multi-layer substrates are described in U.S. patent application Ser. No. 12/944,576, published as U.S. Patent Publication No. 2011/0111300 and incorporated by reference herein in its entirety. A multi-layer substrate may include one or more intermediate layers disposed between a main substrate material and an active material layer, for example. For example, an intermediate layer may prevent substrate materials from diffusing into (and thereby degrading the performance of) catalysts used to grow active material nanostructures. Additionally, in some cases, an intermediate layer may prevent interaction between the substrate and active material precursors and/or other reagents used during active material fabrication and other processing operations. Further, the intermediate layer may enhance adhesion of the active material to the substrate, especially when nanostructures undergo substantial volume change during cycling. Still further, an intermediate layer may provide, e.g., an epitaxial or chemical-bond connection between the substrate and active material nanostructures (to address a lattice mismatch and reduce strain), and/or a thermal expansion coefficient that allows electrode sub-assemblies to be brought from processing temperatures (e.g., deposition temperature, post-deposition treatment temperatures) to the room temperature without causing fractures at the substrate-active material interface, and be electrically conductive. An intermediate layer could facilitate or accelerate nanowire growth since surface roughness and wettability between the intermediate layer and catalyst islands can be optimized by choosing different deposition process and different intermediate materials. An intermediate layer may be also used to promote mechanical integrity during a roll to roll or other method of fabrication (e.g., prevent deformation because of a high temperature, high tension environment).

Selection of materials for an intermediate layer depends on substrate materials, active materials, contact/attachment conditions, targeted functionality of the intermediate layer, and other parameters. Examples of intermediate layer materials include refractory metals, such as tungsten, molybdenum, niobium, tantalum, rhenium, tungsten nitride, tungsten carbide, titanium, titanium oxide, titanium nitride, titanium carbide, zirconium, zirconium nitride, tantalum, tantalum nitride, cobalt, ruthenium, indium oxide, cadmium, hafnium, tellurium, tellurium oxide, tellurium nitride, chromium, iron, chromium oxide, a titanium-tungsten combination, an iron-tungsten combination, a cobalt-tungsten combination, molybdenum, nickel, lithium and others. A thickness of the intermediate layer may be between about 1 nanometer and 5 micrometers, for example, between about 5 nanometers and 1 micrometer. In some embodiments, the thickness may be between about, for example, 25 nanometers and 100 nanometers. Introducing certain materials into the layer, such as copper nickel, chromium, and titanium may improve adhesion of deposited nanostructures to the substrate surface. The thickness generally depends on functionality required from the layer and corresponding properties of the materials included in the layer. In certain embodiments, the intermediate layer has a contact resistance per unit surface area of the layer that is less than about 10 Ohm-centimeter squared or in some embodiments less about 5 Ohm-centimeter squared. A resistance over a unit of surface area is defined as a resistivity of the intermediate layer materials multiplied by a thickness of the layer.

In certain embodiments, an intermediate layer includes tungsten having a thickness of between about 150 nanometers and 250 nanometers. Tungsten does not form alloys with many materials that can be used as catalysts to grow high capacity nanostructured materials. In other embodiments, a composite intermediate layer is used containing a sub-layer of tungsten containing material (e.g., between about 150 nanometer and 250 nanometer thick) and a sub-layer of titanium containing material (e.g., between about 1 nanometers and 50 nanometers thick). The titanium sub-layer may be used to enhance adhesion of the intermediate layer to the substrate.

In certain embodiments, an intermediate layer includes chromium and has a thickness of between about 500 nanometers and 1,500 nanometers. While chromium forms an alloys with gold (and possibly cannot be used with this type of catalyst), it can be used successfully with other catalysts and can be deposited over copper, nickel, and silver substrate layers.

In certain embodiments, the electrode includes multiple intermediate layers that form a stack. Each of these layers may contain the same or different materials. A stack of the intermediate layers may also be referred to as a "barrier system." A number of layers may depend on materials used, deposition techniques, and targeted functionality. In certain embodiments, a composite intermediate layer is used, for example, as a combination of an adhesion layer and a diffusion barrier, as a combination of a diffusion barrier and a nucleation surface layer, as a combination of an adhesion layer, a diffusion barrier, and a nucleation surface layer, and in a case where two materials provide better a diffusion barrier than just one (e.g., synergistic diffusion barrier effects).

In certain embodiments, one layer in a stack may be used to improve adhesion of the nanostructures to the substrate. In certain embodiments, one layer may be used to improve adhesion of the substrate to the stack, while another layer may be used to improve adhesion of the nanostructures to the stack. Examples of materials for such layers include chromium, titanium, tungsten, tantalum, nickel, and molybdenum. An adhesion layer may be chosen to accommodate substantial swelling of the nanostructure base, while the substrate remains substantially static.

In some embodiments, a layer may be used as a diffusion barrier. This layer may prevent the substrate from interacting with catalyst islands, precursors, and reaction products. In certain embodiments, an intermediate layer may be used to assist in formation of catalyst islands during a deposition process. For example, a layer may be used to modify surface properties of the substrate to provide adequate surface tension so that the catalyst islands are agglomerated or aggregated. In other embodiments, the layer may be used to prevent substrate damage during lithographic etching, ablation, and other methods of forming catalyst islands.

In certain embodiments, an intermediate layer or a portion of the intermediate layer has a surface condition that facilitates nucleation of the nanostructures deposited on or grown from the substrate. Examples of these properties include surface roughness, surface polarization, surface tension, and morphology of the surface materials (e.g., crystalline, amorphous, lattice size and orientation). These properties can be controlled by selecting certain materials for an intermediate layer (or portions thereof). Examples of such materials include chrome, tungsten, nickel, molybdenum, iron, as well as mixtures and alloys containing one or more of these materials.

Current Collection

The description herein provides improved current collection in batteries. In some implementations, an electrode structure of a battery may include an active material and two or more current collectors in electrical communication with the active material. In some implementations, an electrode structure of a battery may include two or more current collector layers.

As described above, an electrode structure may or may not include a current collector substrate. In some implementations that include a current collector substrate, a second electronically conductive path is provided in the form of an additional layer over and in electronic communication with the active material. The second electronically conductive path can ensure that electronic communication between the active material and the current collector is maintained throughout the life of the battery. The additional layer is electronically conductive and can be thin, and does not interfere adversely with battery operation.

FIG. 1 shows a cross-sectional depiction of an electrode 110 including an active material layer 104 on a current collector substrate 102. In some implementations, the current collector substrate is a highly conductive metal substrate that functions as the primary current collector of the electrode 110. Examples include substrates including copper, nickel, aluminum, stainless steel, and titanium. In some implementations, the active material layer is a nanostructured During cycling of a battery that uses such an electrode, delamination can occur between the active material layer 104 and the current collector substrate 102; in the example of FIG. 1, a portion of the active material layer 104 delaminates after cycling, forming a gap 105 between the active material layer 104 and the current collector substrate 102. This reduces the area available for electrons to flow to and/or from the active material layer 104. Electrode 110' includes a current collector layer 106 that is in electronic communication with the active material layer 104 and the current collector substrate 102. Current collector layer 106 provides additional area available for flow of electrons so that battery performance is not compromised even if much delamination were to occur. In the example of electrode structure 101' in FIG. 1, gap 105 formed due to delamination reduces direct electron flow from active material layer 104 to current collector substrate 102; however, current collector layer 106 provides a path for electron flow across top surface 103 of the active material layer 104. In some implementations, electron flow across interfaces between the active material layer 104 and one or more sidewall surfaces 107 may also be present. In the example of FIG. 1, current conductor layer 106 provides a conductive path to and from current collector substrate 102. As described further below, current collector layer 106 is porous to lithium ions (or other electrochemical species). Current collector layer 106 can be a nanostructured material, for example, a carbon nanofiber (CNF) net or a metal fiber net, e.g., a copper or nickel nanofiber net. In some implementations, current collector layer 106 can include a conductive additive in a binder material. Further examples of materials for current conductor layers are given below.

Figure 2:
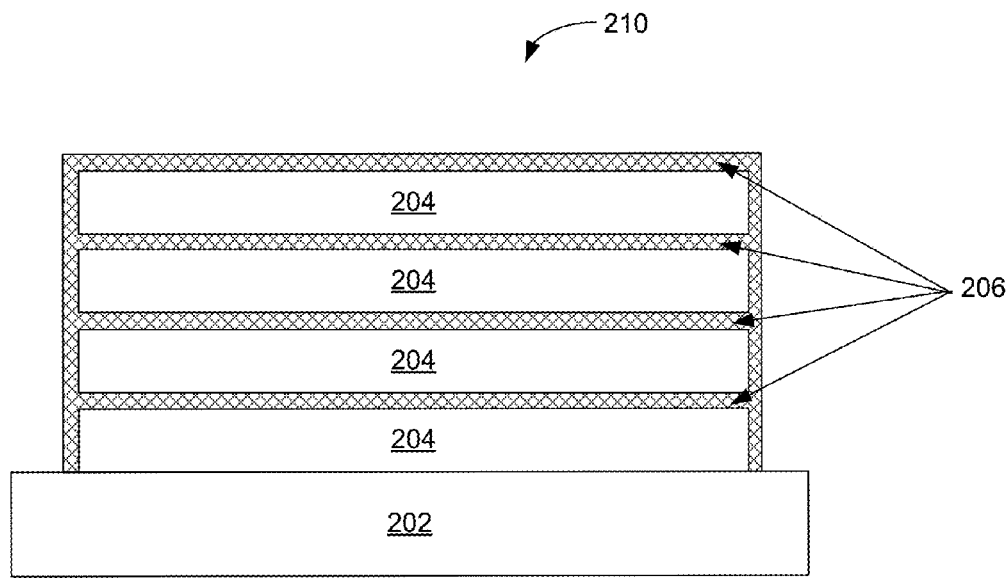
FIG. 2 shows a cross-sectional depiction of an example of an electrode structure having layers of electrode active material interspersed with layers of current collector.

In some implementations, the electrode structures described herein include one or more layers of current collectors interspersed with one or more active material layers. For example, current collector layer 106 in FIG. 1 may be disposed within active material layer 104. FIG. 2 shows another example, in which electrode structure 210 has several layers 204 of electrode active material that are interspersed with layers 206 of current collector, according to certain implementations. All of current collector layers 206 are in electronic communication 206 with current conductor substrate 202 and active material layers 204. While a second current collector provides additional area through which electrons can flow to and from the electrode, additional layers of current collector, which are all in electronic communication with both the active material layers and the current collector substrate, provide even more such area.

Figure 3:
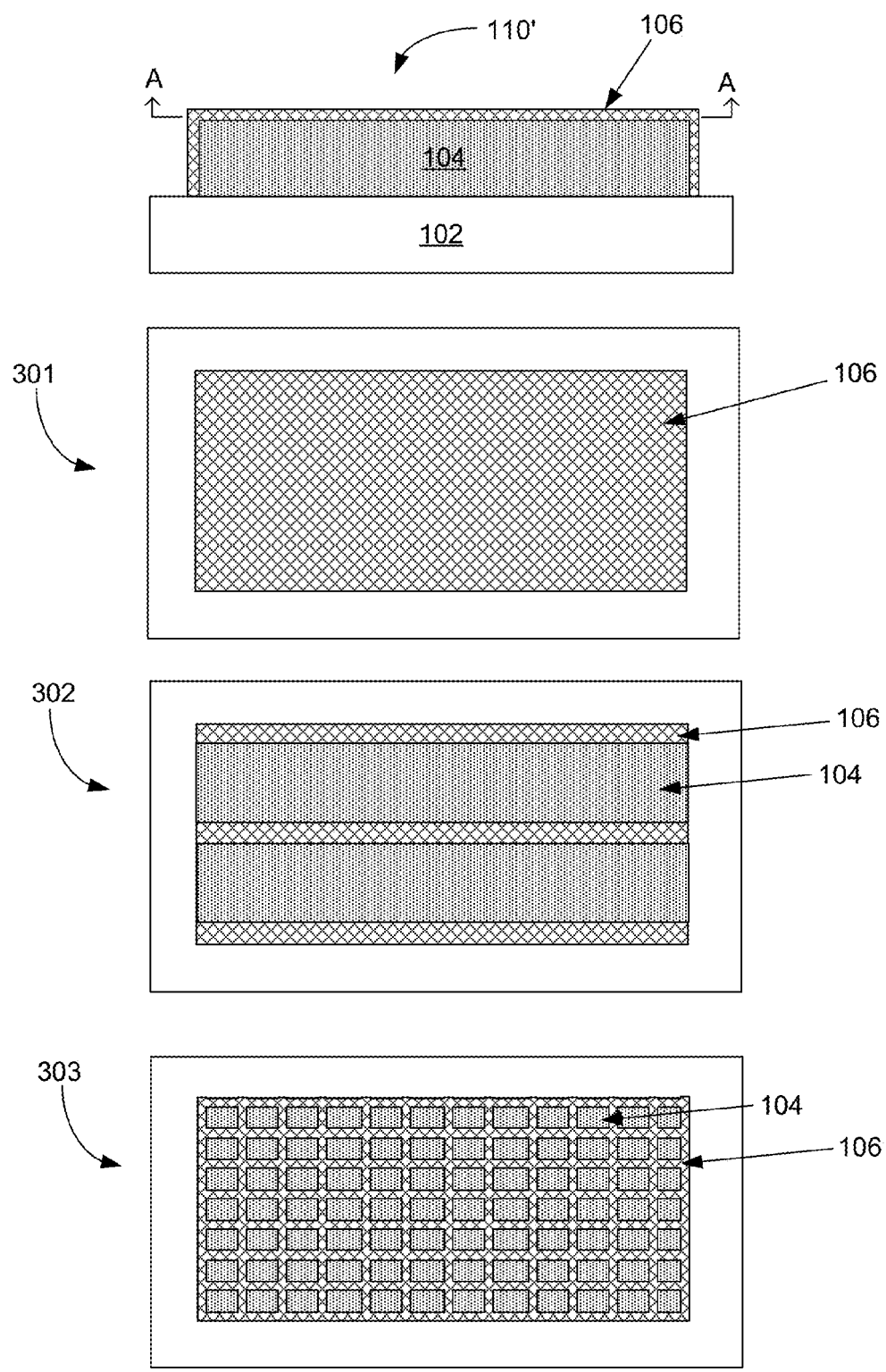
FIG. 3 shows plan view depictions of examples electrode structures having a current collector layer on an active material layer.

According to various implementations, each current collector layer may be distributed uniformly or non-uniformly on or under an active material layer. Examples are schematically illustrated in FIG. 3, which shows plan views 301-303 of electrode structure 101' across line A-A. In plan view 301, current collector layer 106 is uniformly distributed across active material layer 104. Plan views 302 and 303 provide examples of implementations in which current collector layer 106 is distributed non-uniformly across the active material layer 104 providing increased exposure area of active material layer 104. While distributed non-uniformly, current collector layer 106 still provides a conductive pathway to current collector substrate 102. While the examples in FIG. 3 show ordered, regularly spaced, conductive pathways of the current collector layer 106, according to various implementations, the layers may be disordered or irregularly spaced. Non-uniform current collector layers may be patterned or result from non-uniform deposition and/or growth characteristics. In some implementations, non-uniform current collector layers may be used to provide area for electrochemical species penetration into the active layer 104, for example, if the current collector layer material is non-porous. Any of the layers 206 in FIG. 2 or 406 in FIG. 4 can be uniformly or non-uniformly distributed across an active layer. According to various implementations, the distributions of multiple current collectors across different layers of electrode structures that include multiple current collector layers can be the same or different. For example, the layers 206 in FIG. 2 may all be distributed uniformly, all be distributed non-uniformly, or some of the layers may be distributed uniformly and some non-uniformly. Uniform distributions may be different or the same for each current collector layer; similarly, non-uniform distributions may be different or the same for each current collector layer.

Figure 4:
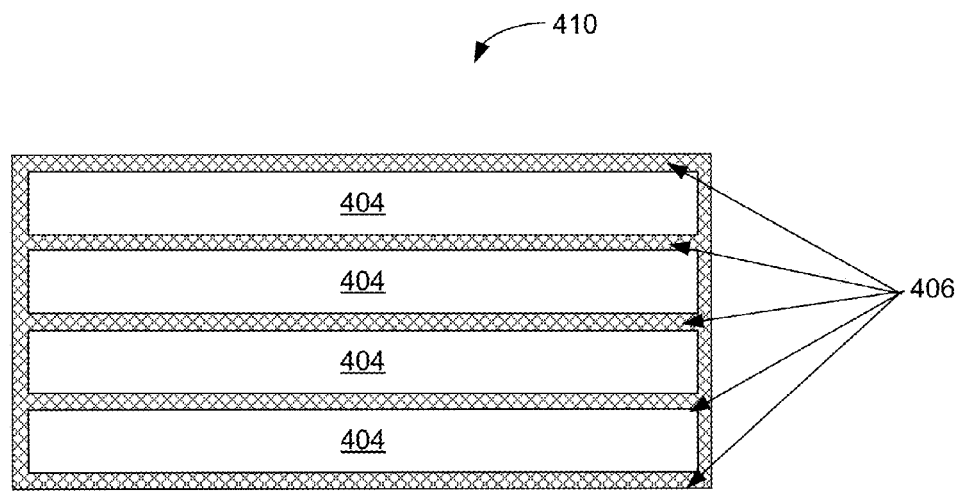
FIG. 4 shows a cross-sectional depiction of an example of an electrode structure without a current collector substrate.

FIG. 4 shows an example of an electrode structure 410 without a current collector substrate. Current collector layers 404 surround active material layers 404, and in the example of FIG. 4, are also interspersed with active material layers 404. Current collector layers 404 are electronically interconnected and are connected to an external load directly or via another connector (not shown). Example thicknesses for a silicon nanostructure anode can be about 20 to 30 micrometers, either in a one layer structure (e.g., as shown in FIG. 1) or as a total thickness of active material layers 404 in FIG. 4. In another example, for anode having a carbon active material, the total thickness of the active material including binder can be about 80 micrometers. Example thicknesses of layers 406 (individually or together) can be about 1 nanometer to 5 micrometers, e.g., 100 nanometers to 5 micrometers. In some implementations, layer 406 can be 500 nanometers to 3 microns. In some implementations, the current collector layers on the outside of the structure can be thicker than those embedded within the structure.

For high energy density batteries, the current collector layer is substantially thinner than the active material layer to maintain high energy density. Examples of thickness ratios (total active layer thickness:total current conductor layer thickness) can range from about 150:1-5:1, e.g., 60:1 or 10:1. For example, for a 30 micrometer silicon nanowire active layer, the current collector layer may between about 200 nanometers and 5 micrometer, or 200 nanometers and 3 micrometer. In some extreme cases, lower ratios may be used. For example, in implementations that do not include a current collector substrate, a ratio of 1:1 may be used. Further, higher ratios may also be used in some implementations so long as the current collector layer is thick enough to provide sufficient conduction. In some implementations, for example, thick electrodes may especially benefit from one or more current collector layers as described herein due to the long pathways through active material that would otherwise be present.

The current collector layer material is a material that has a higher electronic conductivity than the active material. In some implementations, the current collector layer may have a conductivity less than or equal to that of a current collector substrate, if present. In some implementations, a material is such that the contact resistance per unit surface area of a current collector layer that is less than 10 Ohm-centimeter squared.

Examples of materials include metals such as copper, nickel, chromium, tungsten, metal nitrides, metal oxides, metal carbides, carbon, conductive polymers, and combinations thereof. In some implementations, the current collector layer can be a nanomaterial network, including nanofiber, nanowire, and nanotube network. Further examples of nanomaterial networks can include networks of spheres, cones, rods, tube, wires, arcs, belts, saddles, flakes, ellipsoids, meshes, laminate foams, tapes, and combinations thereof. The network may be a non-uniform, continuous film in some implementations. That is, a film provides one or more continuous conductive pathways while allowing electrochemical species transport through the film. Electronically conductive binders can also be added to any of the current collectors described herein. In addition, combinations of materials, as described herein, can be used to form a current collector layer.

In some implementations in which current collector layer is nanostructured, the nanostructures may be oriented such that their longest dimension extends in a direction generally parallel to the plane of an underlying layer or, if present, a current collector substrate.

As noted above, in some implementations, a current collector layer contains carbon. The carbon may be, for example, carbon fibers or tubes, graphite, graphene, and/or carbon sheets. In one arrangement, the carbon is in the form of linear carbon nanostructures, such as nanofibers or nanotubes. The nanostructures can form a net over the active material layer. In another arrangement, the carbon is in the form of a graphene sheet containing one or more layers of graphene. In another arrangement, the carbon is in the form of amorphous carbon.

In some implementations, the current collector layer contains a metal such as copper or nickel. In one arrangement, the metal is in the form of linear nanostructures, such as nanowires. The nanostructures can form a net over the active material layer. In another arrangement, the metal is in the form of a thin sheet containing one or more atomic layers of metal. In such an arrangement, the thin sheet may be non-uniformly distributed.

Electronically conductive binders can also be added to any of the second current collectors described herein. Examples of conductive binders include conductive polymer binders such as graphene polymer binders and polyfluorene polymer binders and binders having conductive particle additives. In addition, combinations of materials, as described herein, can be used to form the current collector layer. For example, in some implementations, a carbon nanostructured network may be coated with copper or another metal.

According to various implementations, the current collector layer may be between about 1 nanometer and 5 micrometers thick, for example, between about 5 nanometers and 1 micrometer thick. The thickness of a layer may depend on the particular arrangement of the electrode. For example, in implementations in which the electrode does not include a separate current collector substrate, a thickness near the high end of these ranges may be employed.

The current collector layer is generally a discrete layer attached to or otherwise in contact with an underlying and/or overlying active material layer. In some cases, the boundary between an active material layer and a current collector layer is not sharp or abrupt. This may be the case, for example, where the current collector includes three-dimensional (3-D) structures that have branches that extend into the active layer. In another example, in some implementations, active material layer and the current collector may include overlapping nanostructured networks of active material and current collector. In these cases, the networks may overlap throughout the layers or only in a boundary region.

Figure 5:
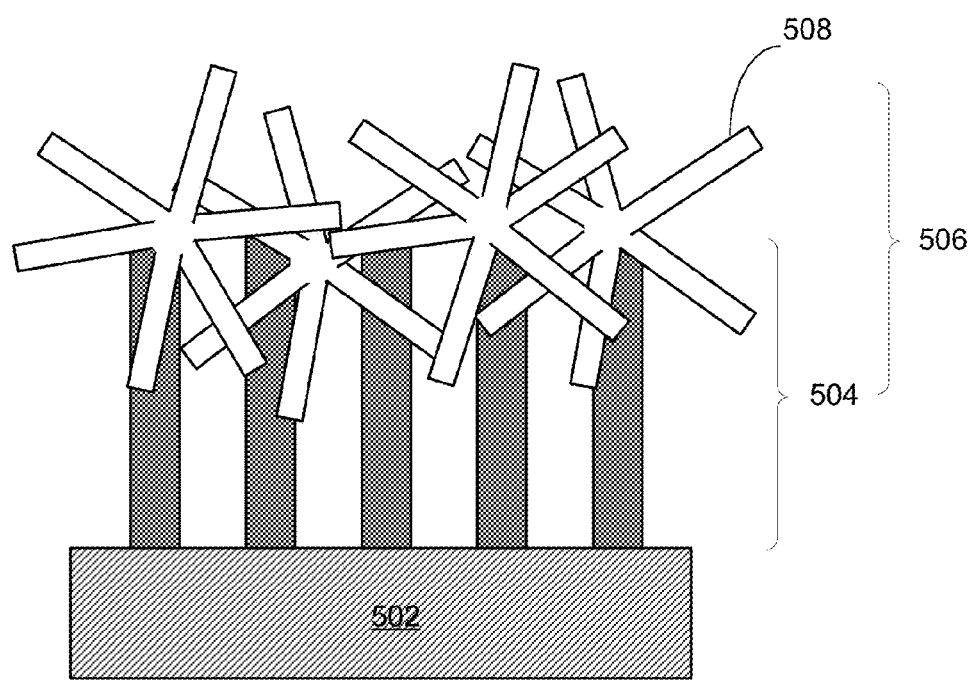
FIG. 5 shows a cross-sectional depiction of an example of an electrode including a nanostructured active material layer and a nanostructured current collector layer having three-dimensional nanostructures that penetrate into the active material layer.

In many implementations, the correct collector layer is 2-D, i.e., a thin layer extending across an active material. In some implementations, all or a portion of a current conductor layer may have a 1-D character, for example a single nanowire or tight cluster of nanowires may extend across an active material layer. In some implementations, a 2-D structure can include one or more conducting branches like 3-D structures. For example, a "fuzzy ball" nanostructure having branches extending from a central particle may be used, with some of the branches penetrating into the active layer and improving conductivity. According to various implementations, a branch may or may not make contact with a current collector substrate or another current collector layer. In the former case, conductivity may be further improved. A schematic example of an electrode structure 510 including a current collector substrate 502, a nanostructured active material layer 504 and a current collector layer 506 including fuzzy ball nanostructures 508 is shown in FIG. 5. Some branches of the nanostructures 508 extend into the nanostructured active material layer 504, which can aid the mechanical integrity of the current collector layer 506, as well as improving conductivity throughout the nanostructured active material layer 504. In some implementations, such branches extending into an active material layer may be formed with a conductive polymer.

Current collector layers may be deposited over active material layers using one or more of various deposition techniques, such as chemical vapor deposition (CVD), which includes plasma enhanced CVD (PECVD) and thermal CVD, atomic layer deposition (ALD), physical vapor deposition (PVD), which includes sputtering and evaporations, electroplating, electroless plating, spraying, electrospinning, slurry deposition, and/or solution deposition techniques. Using plasma may make it possible to perform the deposition at a lower temperature than with CVD alone, which may be important to preserve the integrity of the active material layer. In certain embodiments, a pulsed PECVD method is used. The deposition method should be such that sufficient contact is made with the active material layer to provide area for electron flow at least across the top surface of the active material layer. Depending on the deposition technique, the current collector layer may or may not be in electronic communication with the active layer on the sides of the active material layer. The current collector layer is in electronic communication with the current collector substrate (if present) and other current collector layers via vertical extensions of the layer along the sidewalls of the active material layer (e.g., as shown along sidewall 107 in FIG. 1) and/or within the active material (e.g., as described above with reference fuzzy ball structures). In some implementations, each current collector layer may form a mat-like layer over the active layer or stack of previously formed active material and current collector layers. The current collector layers may be conformal to the underlying layers.

In some implementations, a current conductor layer may include catalyst particles that catalyze growth into an active layer, such as shown in the example of FIG. 5. In some implementations, a current conductor layer may include catalyst particles for the generation of an active material layer on the current conductor layer.

In one example, after depositing an active layer onto a current collector substrate (or existing current collector layer), a current collector layer can be slurry deposited onto the active layer. Slurry deposition as known in the art can be used to set the desired current collector layer thickness. For example, a commercially available carbon nanotube paste can be directly slurry deposited onto the active layer. In another example, a nanomaterial ink can be sprayed onto an active material layer. In another example, a current collector layer can be grown on the active material layer. For example, a silicon nanowire (SiNW) active layer may be formed and a metal layer coated onto all or an upper portion of the formed nanowires. Methods of forming SiNW active layers can be found for example in U.S. Pat. No. 8,257,866, and U.S. Patent Publication No. 2010/0330423, incorporated by reference herein in their entireties. Catalytic growth of the current conductor layer can then be performed on the metal-coated SiNW's. For example, a conducting layer of nickel silicide (NiSi) nanowires may be formed.

In implementations in which a current collector substrate is present, the active material layer and current collector layer or layer stack are formed on the current collector substrate. In implementations in which a current collector substrate is not present such as in the example of FIG. 4, a carrier substrate may be used to support the stack during fabrication. For example, a current collector layer may be deposited on a carrier substrate, followed by formation of an active material layer, another current collector layer, etc. After the electrode stack is built up in this manner, the carrier substrate may be removed. In some implementations, a selectively removable layer may be disposed between the carrier substrate and the electrode structure to aid removal. Examples include thin selectively etchable metal films and laser cleavable polymers used with a transparent carrier substrate.

Examples

Figure 6A:
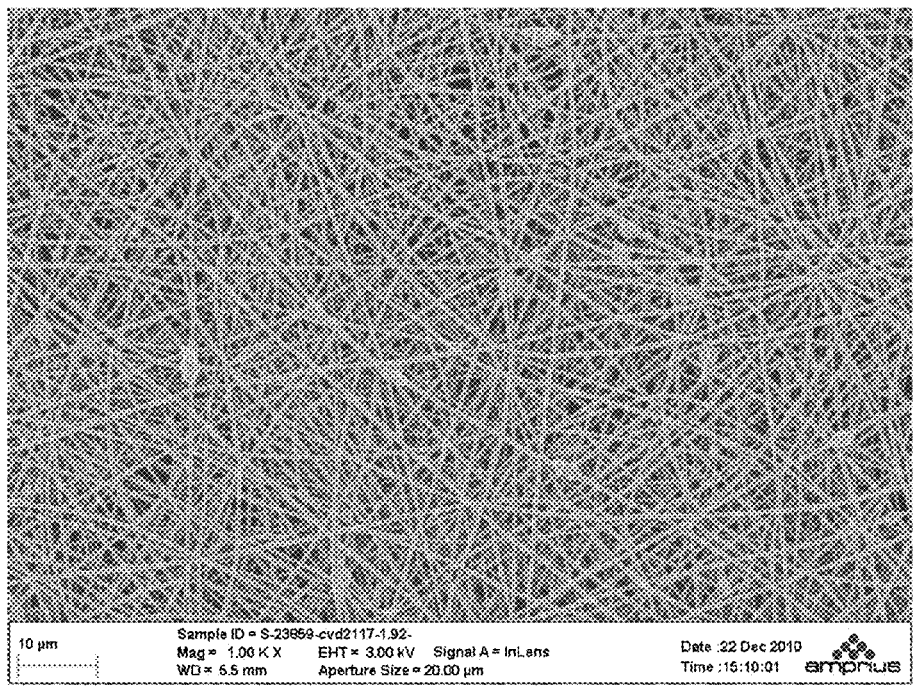
FIGS. 6A-6D show images of a layer of an electrospun carbon fiber as a current collector layer on a layer of active material silicon nanowires.
Figure 6B:
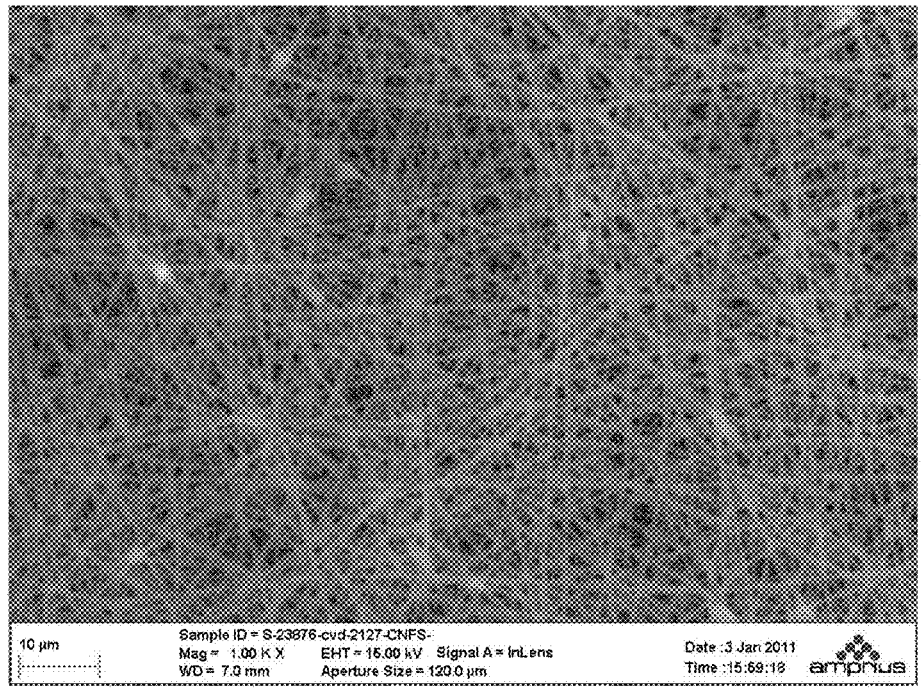
Figure 6C:
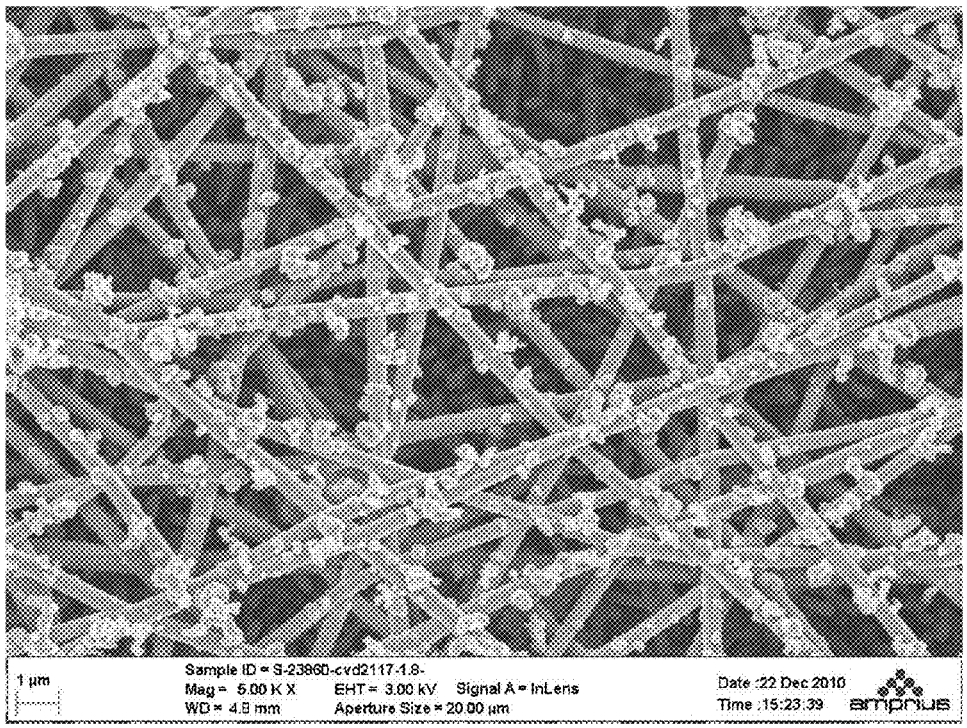
Figure 6D:
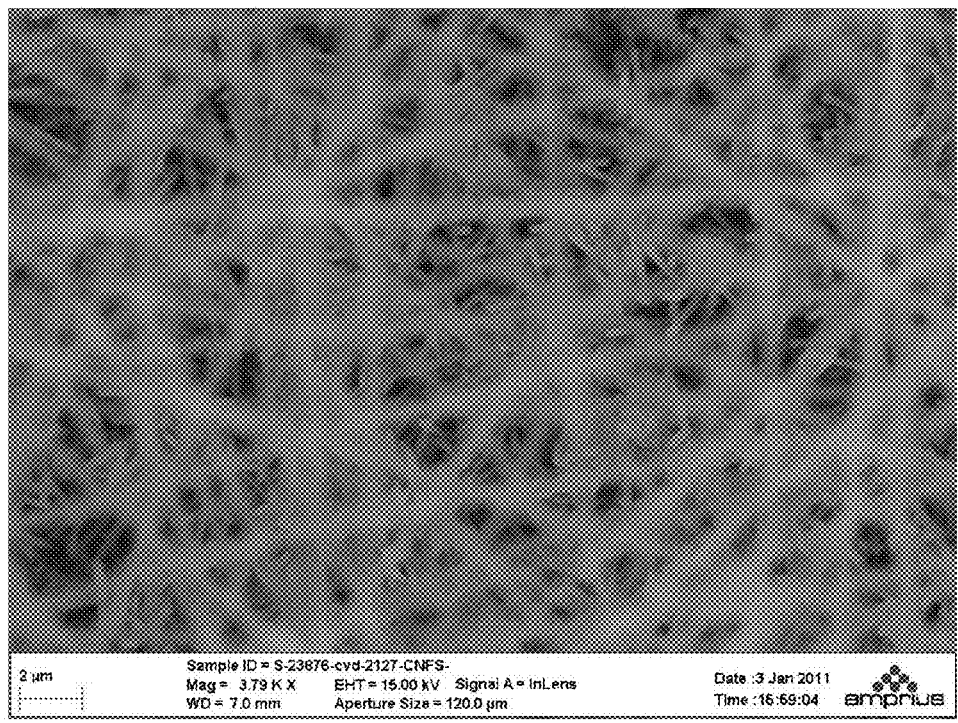
Figure 7:
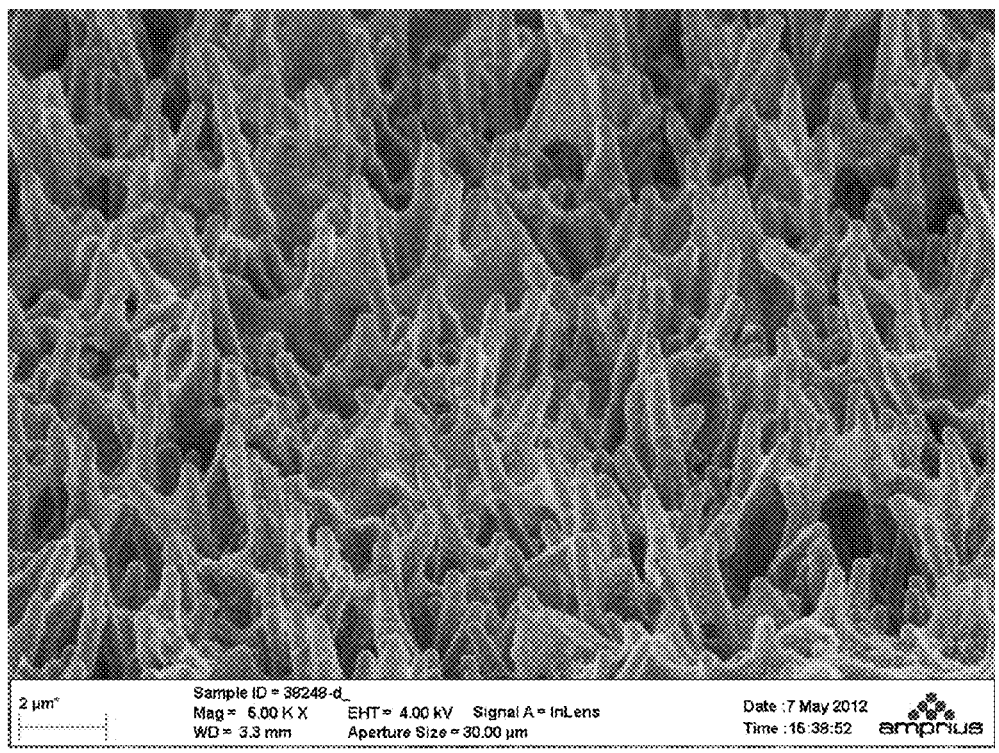
FIG. 7 is an SEM image of a layer of carbon nanotube paste slurry coated onto a SiNW active material layer.
Figure 8A:
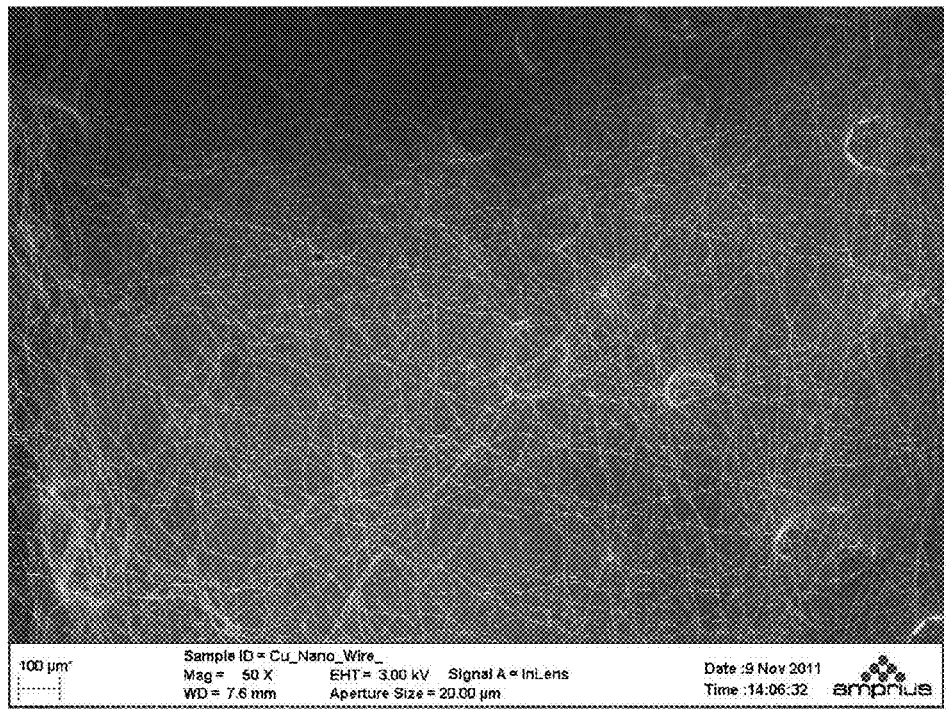
FIGS. 8A and 8B show images of a copper conducting nanowires mat that may be used in current conductor layers.
Figure 8B:
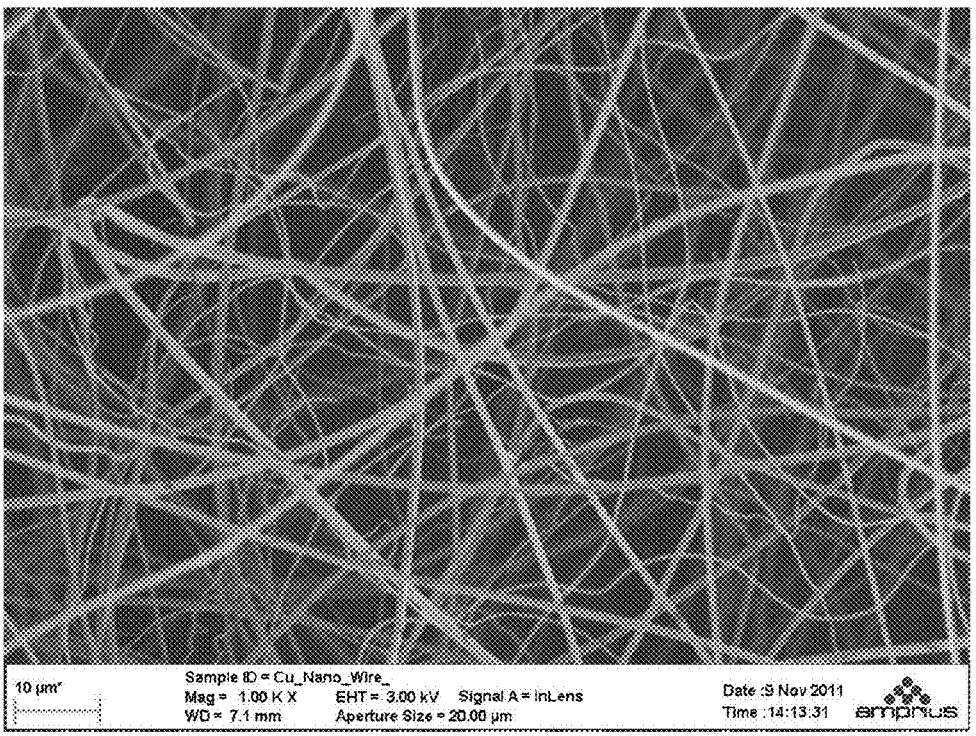
Figure 9A:
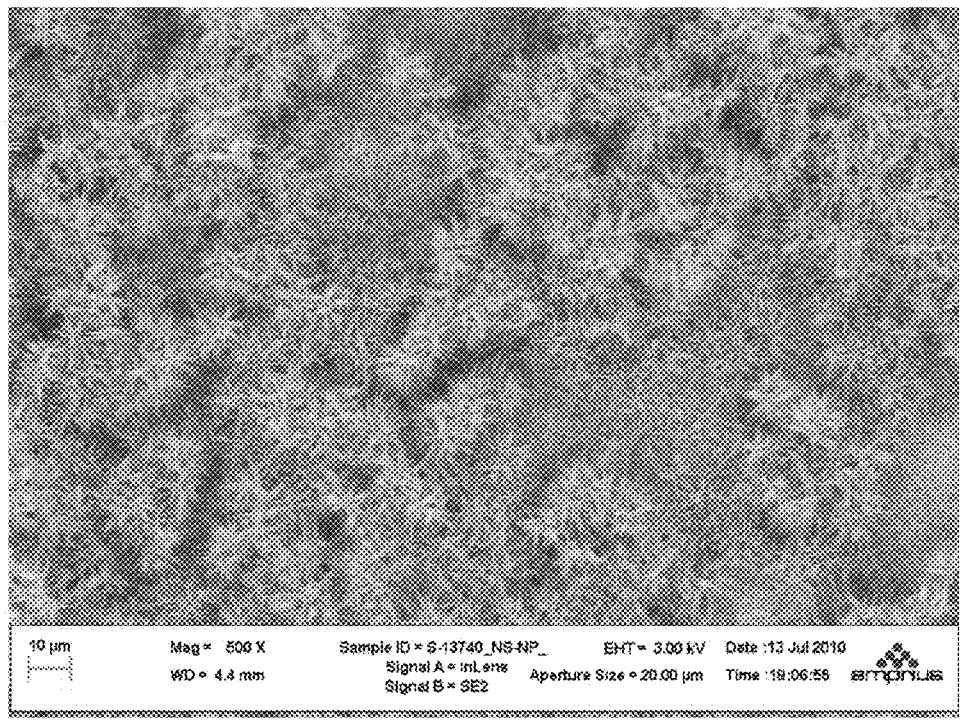
FIGS. 9A-9E show images of a layer of nanowire/nanoparticle hybrid nanostructures that may be used in current conductor layers.
Figure 9B:
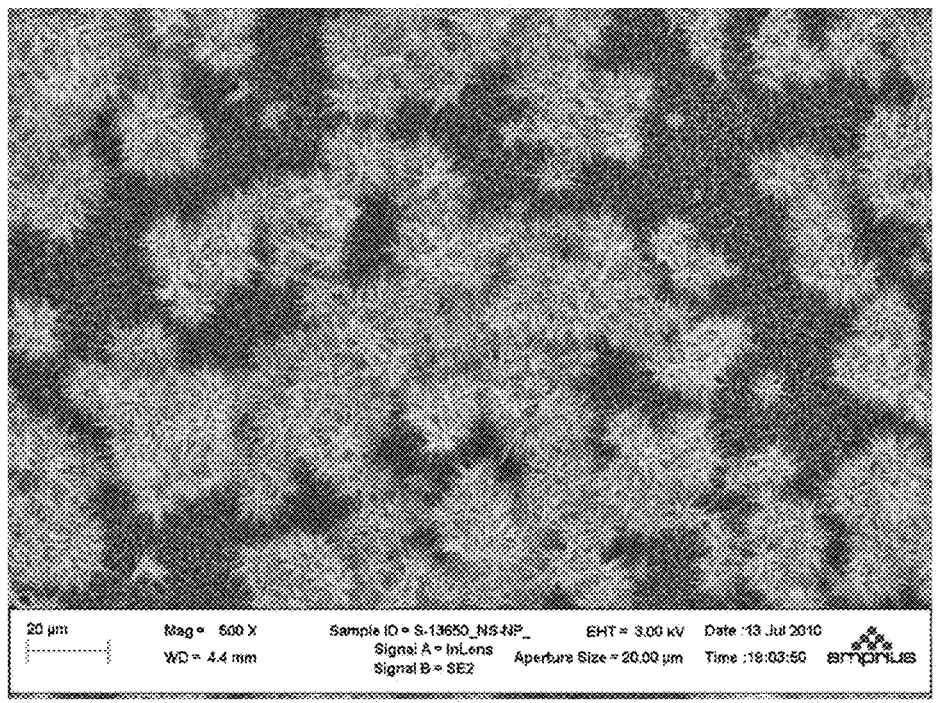
Figure 9C:
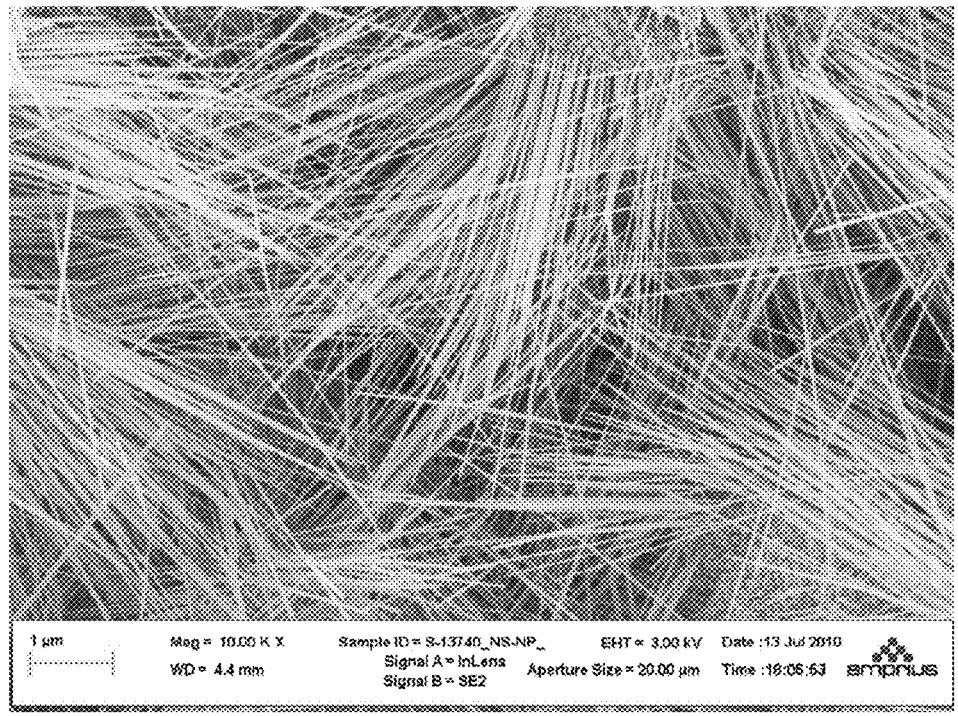
Figure 9D:
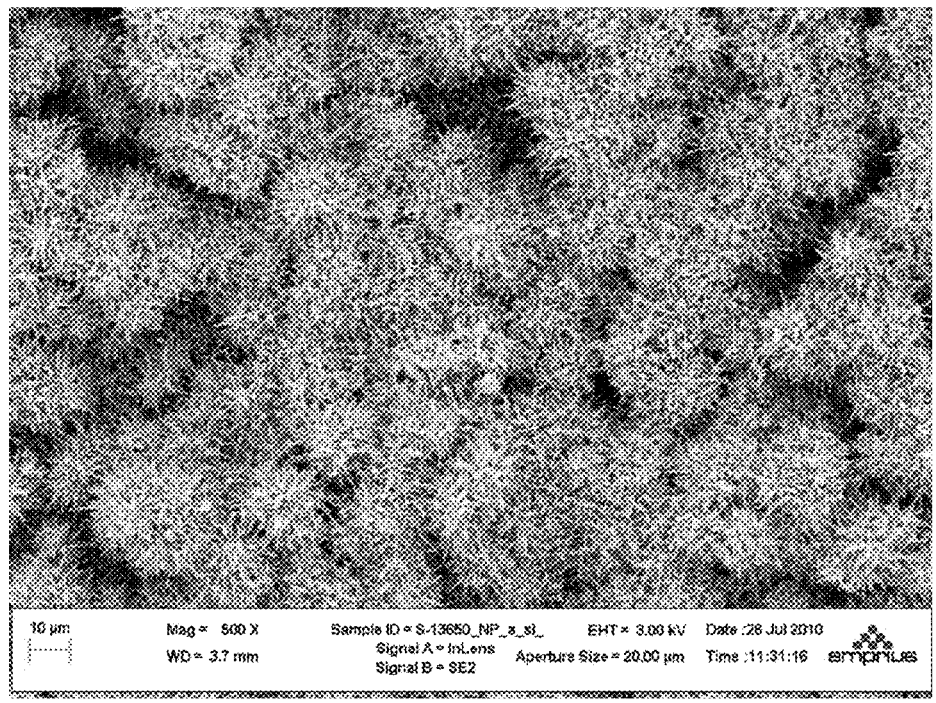
Figure 9E:

FIGS. 6A-6D show images of a layer of an electrospun carbon fiber as a current collector layer on a layer of active material silicon nanowires. FIG. 6A is a low magnification SEM image; FIG. 6B is a low magnification SEM image focused on the underneath SiNW layer; FIG. 6C is a high magnification SEM image; and FIG. 6D is a high magnification SEM image focused on the underneath Si NW layer. FIG. 7 is an SEM image of a layer of carbon nanotube paste slurry coated onto a SiNW active material layer. FIGS. 8A and 8B show images of a copper conducting nanowires mat. FIG. 8A is a low magnification SEM image and FIG. 8B is a high magnification image of the Cu nanowires. FIGS. 9A-9E show images of a layer of nanowire/nanoparticle hybrid "fuzzy ball" nanostructures. FIGS. 9A and 9B are low magnification SEM images of fuzzy ball growth on a SiNW active layer. FIG. 9C is a high magnification image of fuzzy ball nanostructure. FIGS. 9D and 9E are additional SEM images of fuzzy ball nanostructures that may be used in current collector layers. In some implementations, to further improve conductivity, nanostructures or portions thereof can be coated with a conductive film such as copper. For example, the nanowires in FIG. 9D can be coated with copper film.

Figure 10:
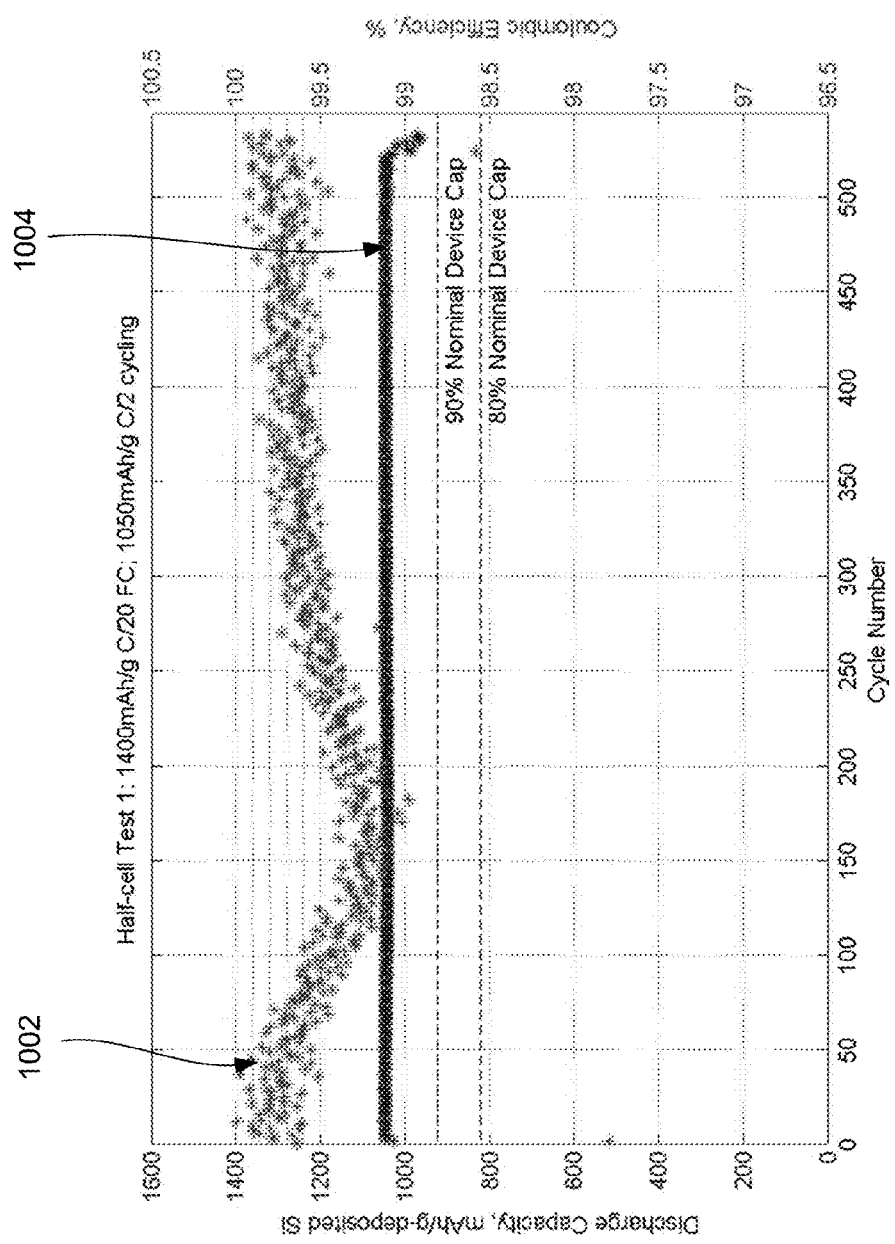
FIG. 10 is a graph illustrating cycling data of a dual current collector silicon nanowire anode half-cell.

FIG. 10 illustrates cycling data of a dual current collector Si NW anode half-cell. The primary current collector was stainless steel foil substrate, with the second current collector a spray coated carbon nanotube suspension over the active material. The anode active material was a Si nanowire/NiSi nanowire material. Specifically, FIG. 10 illustrates columbic efficiency 1002 and discharge capacity 1004 over 500 cycles. The cell maintained a stable capacity of over 1000 mAh/g over this number of cycles. The columbic efficiency was over 99% in each cycle.

Electrode and Battery Arrangements

Figure 11A:
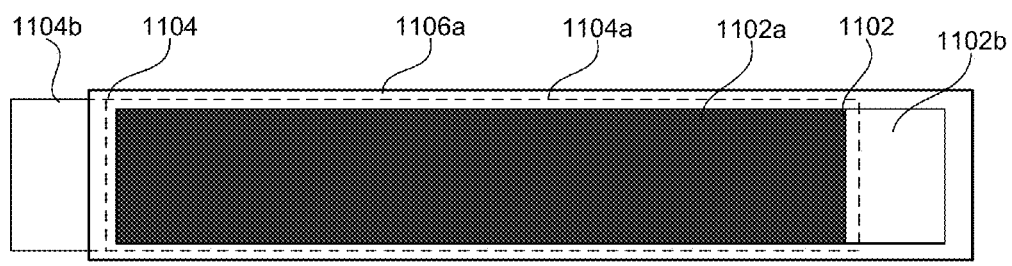
FIGS. 11A and 11B are top and side schematic views of an illustrative electrode arrangement in accordance with certain implementations.

The electrode structures as described above with respect to FIGS. 1-10 can be used to form positive and/or negative battery electrodes. The battery electrodes may then be assembled into a stack or a jelly roll. FIG. 11A illustrates a side view of an aligned stack including a positive electrode 1102, a negative electrode 1104, and two sheets of the separator 1106a and 1106b in accordance with certain embodiments. The positive electrode 1102 may have a positive electrode layer 1102a and a positive uncoated substrate portion 1102b. Similarly, the negative electrode 1104 may have a negative electrode layer 1104a and a negative uncoated substrate portion 1104b. In some embodiments, the exposed area of the negative electrode layer 1104a is slightly larger than the exposed area of the positive electrode layer 1102a to ensure trapping of the lithium ions (or other electrochemical species) released from the positive electrode layer 102a by insertion material of the negative electrode layer 1104a. In certain embodiments, the edges of the separator sheets 1106a and 1106b extend beyond the outer edges of at least the negative electrode layer 1104a to provide electronic insulation of the electrode from the other battery components. The positive uncoated portion 1102b may be used for connecting to the positive terminal and may extend beyond negative electrode 1104 and/or the separator sheets 1106a and 1106b. Likewise, the negative uncoated portion 1104b may be used for connecting to the negative terminal and may extend beyond positive electrode 1102 and/or the separator sheets 1106a and 1106b.

Figure 11B:
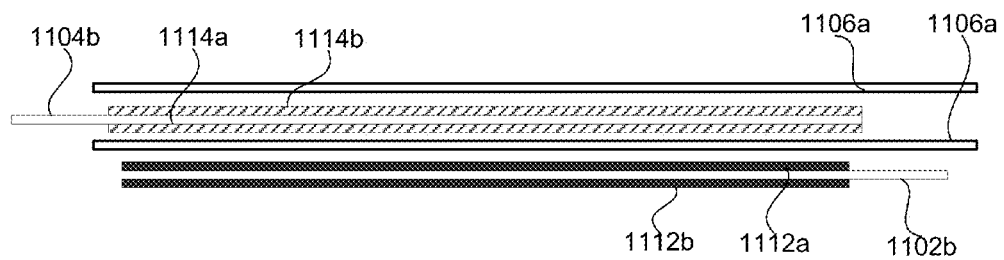

FIG. 11B illustrates a top view of the aligned stack. The positive electrode 1102 is shown with two positive electrode layers 1112a and 1112b on opposite sides of the flat positive current collector 1102b. Similarly, the negative electrode 1104 is shown with two negative electrode layer 1114a and 1114b on opposite sides of the flat negative current collector. Any gaps between the positive electrode layer 1112a, its corresponding separator sheet 1106a, and the corresponding negative electrode layer 1114a are usually minimal to non-existent, especially after the first cycle of the cell. The electrodes and the separators can be tightly wound together in a jelly roll or positioned in a stack that is then inserted into a tight case. The electrodes and the separator may tend to swell inside the case after the electrolyte is introduced and the first cycles remove any gaps or dry areas as lithium ions or other species cycle the two electrodes and through the separator.

Figure 12A:
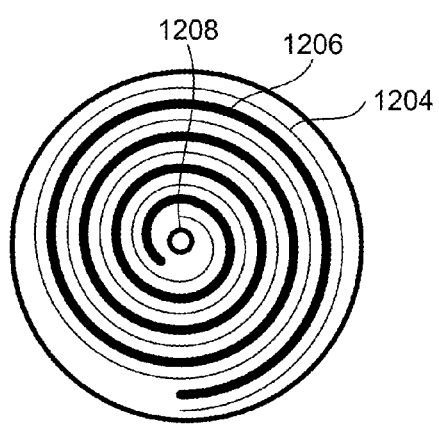
FIGS. 12A and 12B are top and perspective schematic views of an illustrative round wound cell in accordance with certain implementations.
Figure 12B:
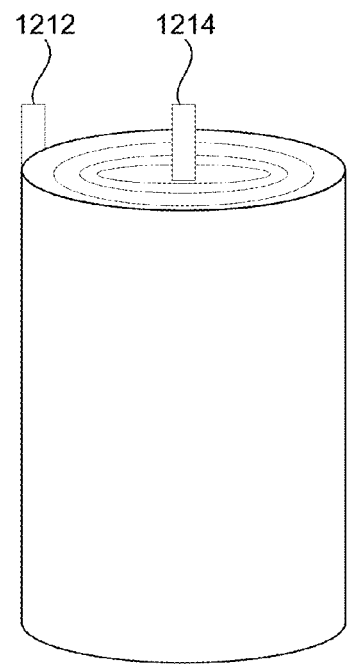

A wound design is a common arrangement. Long and narrow electrodes are wound together with two sheets of separator into a sub-assembly, sometimes referred to as a jellyroll, shaped and sized according to the internal dimensions of a curved, often cylindrical, case. FIG. 12A shows a top view of a jelly roll including a positive electrode 1206 and a negative electrode 1204. The white spaces between the electrodes represent the separator sheets. The jelly roll is inserted into a case 1202. In some embodiments, the jellyroll may have a mandrel 1208 inserted in the center that establishes an initial winding diameter and prevents the inner winds from occupying the center axial region. The mandrel 1208 may be made of conductive material, and, in some embodiments, it may be a part of a cell terminal. FIG. 12B presents a perspective view of the jelly roll with a positive tab 1212 and a negative tab 1214 extending from the jelly roll. The tabs may be welded to the uncoated portions of the electrode substrates.

The length and width of the electrodes depend on the overall dimensions of the cell and thicknesses of electrode layers and current collector. For example, a conventional 18650 cell with 18 mm diameter and 65 mm length may have electrodes that are between about 300 and 1000 mm long. Shorter electrodes corresponding to low rate/higher capacity applications are thicker and have fewer winds.

A cylindrical design may be desirable for some lithium ion cells because the electrodes swell during cycling and exert pressure on the casing. A round casing may be made sufficiently thin and still maintain sufficient pressure. Prismatic cells may be similarly wound, but their case may bend along the longer sides from the internal pressure. Moreover, the pressure may not be even within different parts of the cells and the corners of the prismatic cell may be left empty. Empty pockets may not be desirable within the lithium ions cells because electrodes tend to be unevenly pushed into these pockets during electrode swelling. Moreover, the electrolyte may aggregate and leave dry areas between the electrodes in the pockets negative effecting lithium ion transport between the electrodes. Nevertheless, for certain applications, such as those dictated by rectangular form factors, prismatic cells are appropriate. In some embodiments, prismatic cells employ stacks rectangular electrodes and separator sheets to avoid some of the difficulties encountered with wound prismatic cells.

Figure 13:
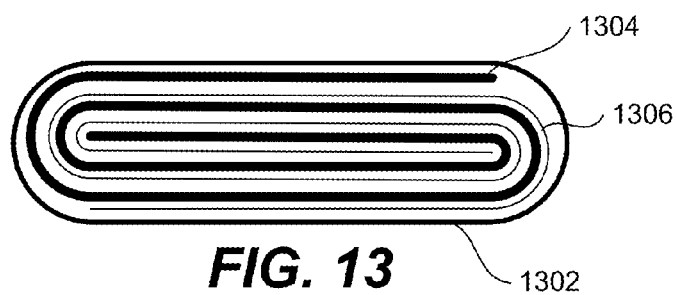
FIG. 13 is a top schematic view of an illustrative prismatic wound cell in accordance with certain implementations.

FIG. 13 illustrates a top view of a wound prismatic jellyroll. The jelly roll includes a positive electrode 1304 and a negative electrode 1306, either or both of which may include a dual current collector as described herein. The white space between the electrodes is representative of the separator sheets. The jelly roll is inserted into a rectangular prismatic case. Unlike cylindrical jellyrolls shown in FIGS. 12A and 12B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 14A:
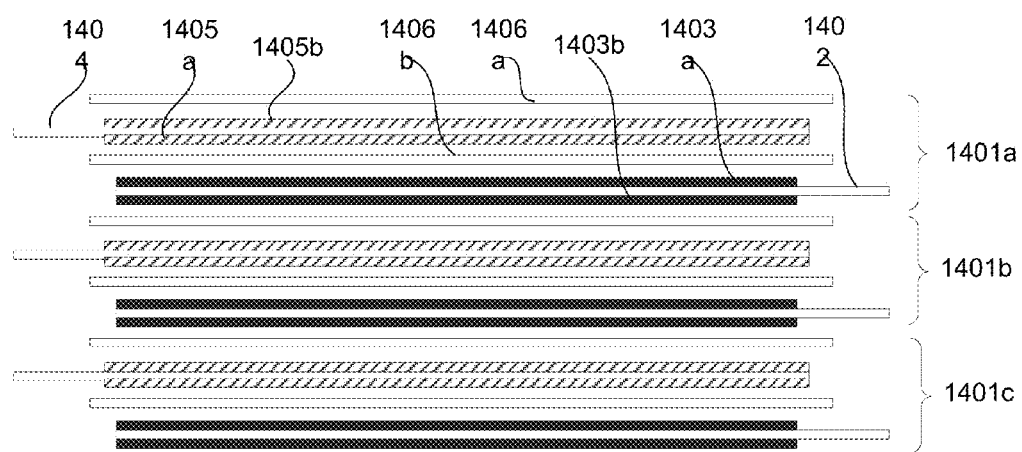
FIGS. 14A and 14B are top and perspective schematic views of an illustrative stack of electrodes and separator sheets in accordance with certain implementations.
Figure 14B:
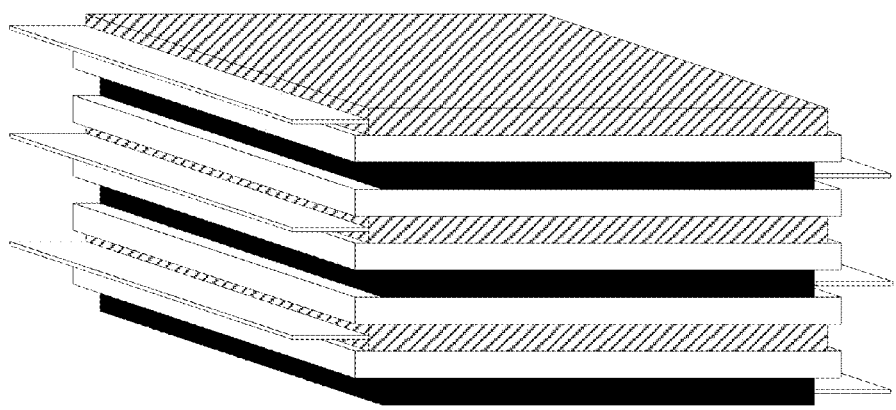

FIG. 14A illustrates a side view of a stacked cell including a plurality of sets (1401a, 1401b, and 1401c) of alternating positive and negative electrodes and a separator in between the electrodes. FIG. 14B illustrates a perspective view of the stacked cell in FIG. 14A. One advantage of a stacked cell is that its stack can be made to almost any shape, and is particularly suitable for prismatic cells. However, such cell typically requires multiple sets of positive and negative electrodes and a more complicated alignment of the electrodes. The current collector tabs typically extend from each electrode and connected to an overall current collector leading to the cell terminal.

Once the electrodes are arranged as described above, the cell is filled with electrolyte. For example, the electrolyte in lithium ions cells may be liquid, solid, or gel. Examples of electrolytes for lithium ion cells are described in U.S. Patent Publication 2010-0330423, incorporated by reference herein in its entirety.

Figure 15:
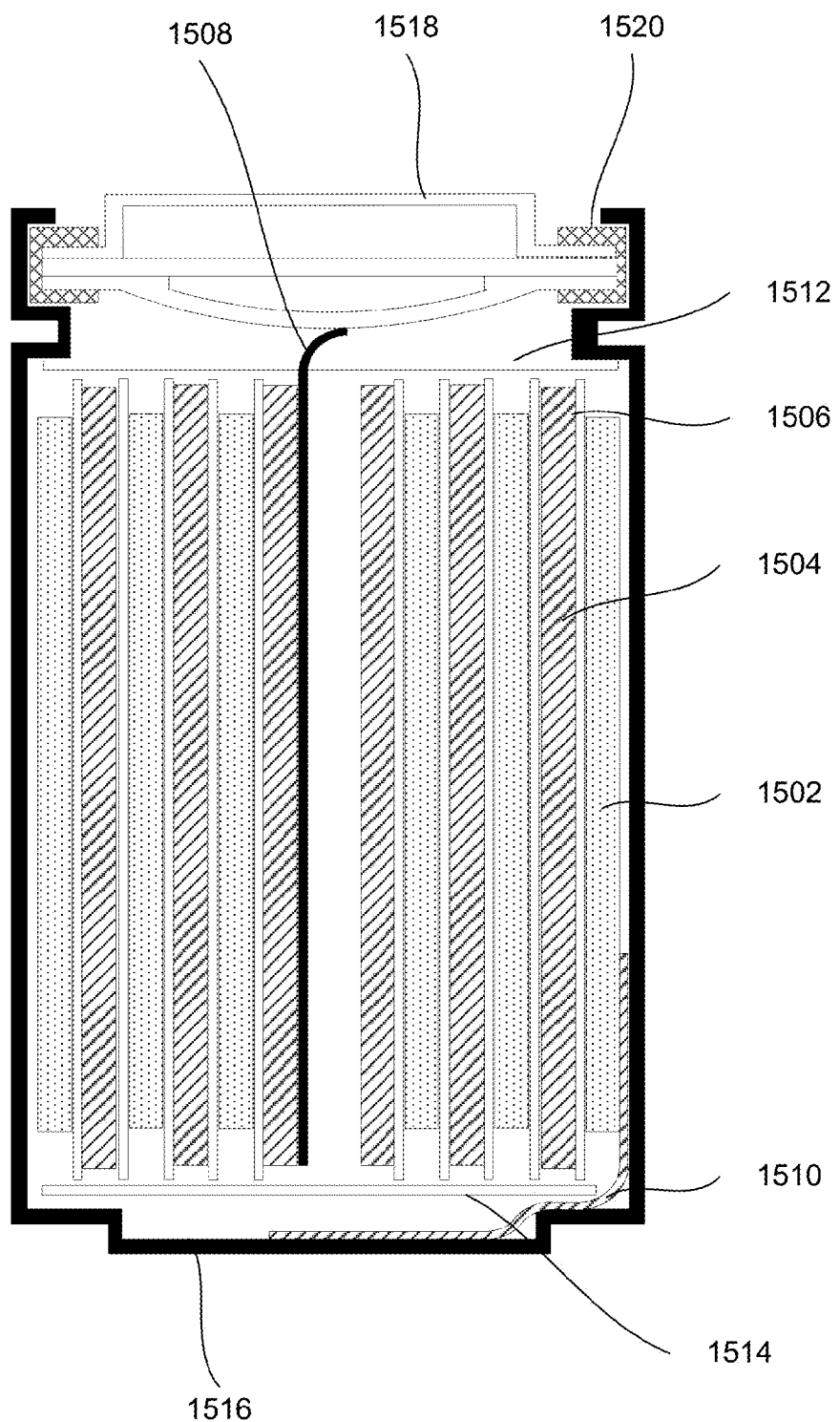
FIG. 15 is a schematic cross-sectional view of an example of a wound cell in accordance with certain implementations.

FIG. 15 illustrates a cross-section view of the wound cylindrical cell in accordance with one embodiment. A jelly roll includes a spirally wound positive electrode 1502, a negative electrode 1504, and two sheets of the separator 1506. One or both of the positive and negative electrodes can include a secondary current collector as described herein to provide high performance even after delamination. The jelly roll is inserted into a cell case 1516, and a cap 1518 and gasket 1520 are used to seal the cell. It should be note that in certain embodiments a cell is not sealed until after subsequent operations.

A rigid case is typically used for lithium ion cells, while lithium polymer cells may be packed into a flexible, foil-type (polymer laminate) case. A variety of materials can be chosen for the case. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pub, and stainless steels may be suitable for the negative conductive case portions and end caps.

In addition to the battery applications described above, the skilled artisan will appreciate, however, that the materials and methods disclosed herein will have application in a number of other contexts where continuous electronic communication is desirable, particularly where fracture of components can occur, with such applications include fuel cells and thermoelectric devices.

CONCLUSION

Although the foregoing invention has been described in some detail, it will be apparent that certain changes and modifications may be practiced within the scope of the appended claims. It should be noted that there are many alternative ways of implementing the processes, systems and apparatus of the present invention. Accordingly, the present embodiments are to be considered as illustrative and not restrictive, and the invention is not to be limited to the details given herein.

What is claimed is:

1. An electrode structure comprising;
   a layer of electrode active material, the layer having a first side and a second side, the second side opposite the first side;
   a first current collector adjacent to the first side and in electronic communication with the electrode active material; and
   a second current collector adjacent to the second side and in electronic communication with both the electrode active material and the first current collector, wherein the first current collector and the second current collector are different materials, and wherein the first current collector is a substrate comprising a metal and the second current collector is nanostructured, with nanostructures of the second current collector oriented such that their longest dimension extends in a direction generally parallel to the plane of the first current collector.

2. The electrode structure of claim 1, wherein the layer of electrode active material has within it one or more sublayers.

3. The electrode structure of claim 1, wherein the electrode active material is an active material comprising a plurality of nanostructures.

4. The electrode structure of claim 3, wherein the plurality of nanostructures of the active material are linear nanostructures.

5. The electrode structure of claim 3, wherein the plurality of nanostructures of the active material are multidimensional.

6. The electrode structure of claim 1, wherein the electrode active material comprises one or more materials selected from the group consisting of silicon, germanium, tin, and alloys thereof.

7. The electrode structure of claim 1, wherein the metal is selected from the group consisting of nickel, copper, titanium, and stainless steel.

8. The electrode structure of claim 1, wherein the second current collector comprises carbon.

9. The electrode structure of claim 8, wherein the second current collector comprises at least one of a graphene sheet, carbon nanofibers or carbon nanotubes.

10. The electrode structure of claim 1, wherein the second current collector comprises metal fibers or nanofibers.

11. The electrode structure of claim 1, wherein the second current collector comprises a nanostructured network.

12. The electrode structure of claim 11, wherein nanostructures of the nanostructured network are linear nanostructures.

13. The electrode structure of claim 1, wherein the second current collector comprises one or more sublayers interspersed with one or more sublayers of electrode active material.

14. A battery comprising:
an anode;
a cathode comprising lithium; and
an electrolyte between the anode and the cathode, the electrolyte configured to allow conduction of lithium ions, wherein the anode comprises:
(a) a layer of active material, the layer having a first side and a second side, the second side opposite the first side;
(b) a first current collector adjacent to the first side and in electronic communication with the active material; and
(c) a second current collector adjacent to the second side and in electronic communication with both the electrode active material and the first current collector, wherein the first current collector and the second current collector are different materials, and wherein the first current collector substrate comprising a metal and the second current collector is nanostructured, with nanostructures of the nanostructure second current collector oriented such that their longest dimension extends in a direction generally parallel to the plane of the first current collector.

15. The electrode structure of claim 7, wherein the second current collector comprises carbon.

16. An electrode structure comprising;
a first layer of electrode active material, the first layer having a first side and a second side, the second side opposite the first side, the first layer of electrode active material configured for intercalation of lithium ions;
a second layer of electrode active material, the first layer having a first side and a second side, the second side opposite the first side, the second layer of electrode active material configured for intercalation of lithium ions;
a first current collector adjacent to the first side of the first layer of electrode active material and in electronic communication with the first layer of electrode active material; and
a second current collector adjacent to the second side of the first layer of electrode active material and adjacent to the first side of the second layer of the electrode active material, and in electronic communication with the first and second layers of electrode active material and the first current collector, wherein the second current collector is distributed non-uniformly across the second layer of electrode active material such that the thickness of the second current collector varies across the second layer of electrode active material.

17. The electrode structure of claim 16, wherein the active material comprises one or more materials selected from the group consisting of silicon, germanium, tin, and alloys thereof.

18. The electrode structure of claim 16, wherein the second current collector is nanostructured.

* * * * *